(12) United States Patent
Dhillon et al.

(10) Patent No.: US 9,258,731 B2
(45) Date of Patent: Feb. 9, 2016

(54) LOAD-DEPENDENT TRANSMISSION IN COMMUNICATION NETWORKS

(71) Applicant: Alcatel-Lucent USA Inc., Murray Hill, NJ (US)

(72) Inventors: Harpreet Singh Dhillon, Austin, TX (US); Howard Huang, New York, NY (US); Harish Viswanathan, Morristown, NJ (US); Reinaldo A. Valenzuela, Holmdel, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 326 days.

(21) Appl. No.: 13/853,507

(22) Filed: Mar. 29, 2013

(65) Prior Publication Data

US 2014/0293777 A1 Oct. 2, 2014

(51) Int. Cl.
*H04W 28/02* (2009.01)
(52) U.S. Cl.
CPC ............ *H04W 28/0231* (2013.01); *Y02B 60/50* (2013.01)
(58) Field of Classification Search
None
See application file for complete search history.

(56) References Cited

U.S. PATENT DOCUMENTS

| | | | |
|---|---|---|---|
| 6,580,704 B1 * | 6/2003 | Wellig et al. | 370/338 |
| 2008/0205358 A1 | 8/2008 | Jokela | |
| 2009/0061799 A1 | 3/2009 | Park et al. | |
| 2009/0086802 A1 | 4/2009 | Nabetani | |
| 2011/0096665 A1 | 4/2011 | McCann et al. | |
| 2012/0034948 A1 | 2/2012 | Wang et al. | |
| 2012/0052900 A1 | 3/2012 | Liu et al. | |
| 2014/0148153 A1 * | 5/2014 | Gleixner | 455/426.1 |

OTHER PUBLICATIONS

The Focalpoint Group, "M2M White Paper: The Growth of Device Connectivity," White Paper, 2003, 5 pages.
Vodafone, "Global Machine to Machine Communication," White Paper, 2010, 20 pages.
Ericsson, "Device Connectivity Unlocks Value," White Paper, Jan. 2011, 13 pages.
G. Fodor et al., "Design Aspects of Network Assisted Device-to-Device Communications," IEEE Communications Magazine, Mar. 2012, pp. 170-177, vol. 50, No. 3.
S-Y. Lien et al., "Toward Ubiquitous Massive Accesses in 3GPP Machine-to-Machine Communications," IEEE Communications Magazine, Apr. 2011, pp. 66-74, vol. 49, No. 4.

(Continued)

*Primary Examiner* — Thai Nguyen
(74) *Attorney, Agent, or Firm* — Ryan, Mason & Lewis, LLP

(57) ABSTRACT

In one embodiment, a first network device detects load information transmitted by a second network device and selects one of a plurality of modes of communication responsive to the detected load information. The modes of communication include at least a first mode of communication that is selected responsive to a relatively low load condition and a second mode of communication that is selected responsive to a relatively high load condition. In each of the modes particular information is to be transmitted from the first network device to the second network device including at least one identifier and associated data, and in different ones of the modes different portions of the particular information are transmitted from the first network device to the second network device using different channel arrangements. The first and second network devices may comprise, for example, respective sensor and access point nodes of a wireless network.

20 Claims, 4 Drawing Sheets

(56) References Cited

OTHER PUBLICATIONS

GSMA, "Experience a World Where Everything Intelligently Connects: The Connected Life," White Paper, Feb. 2012, 6 pages.

Ericsson, "More Than 50 Billion Connected Devices," White Paper, Feb. 2011, 12 pages.

H. Viswanathan et al., "Modeling and Analysis of Cellular Wireless Machine-to-Machine Communication Traffic," submitted to IEEE Journal on Selected Areas in Communications, Apr. 2012, 24 pages.

M.Z. Shafiq et al., "A First Look at Cellular Machine-to-Machine Traffic—Large Scale Measurement and Characterization," ACM SIGMETRICS/PERFORMANCE Joint International Conference on Measurement and Modeling of Computer Systems (SIGMETRICS), Jun. 2012, 12 pages, London, United Kingdom.

Y.-C. Jou et al., "M2M Over CDMA2000 1x Case Studies," IEEE Wireless Communications and Networking Conference (WCNC), Mar. 2011, pp. 1546-1551, Cancun, Mexico.

Health Informatics—PoC Medical Device Communication—Part 00101: Guide-Guidelines for the Use of RF Wireless Technology, IEEE Engineering in Medicine and Biology Society, sponsored by the 11073 General Committee, IEEE Std. 11073-00101-2008, Dec. 2008, 109 pages.

3rd Generation Partnership Project (3GPP), "3rd Generation Partnership Project; Technical Specification Group Radio Access Network; Study on RAN Improvements for Machine-Type Communications; (Release 11)," 3GPP TR 37.868, V11.0.0, Sep. 2011, 28 pages.

Y. Chen et al., "Machine-to-Machine Communication in LTE-A," IEEE 72nd Vehicular Technology Conference (VTC), Sep. 2010, 4 pages, Ottawa, Canada.

M. Martsola et al., "Machine to Machine Communication in Cellular Networks," 2nd International Conference on Mobile Technology, Applications and Systems, Nov. 2005, pages, Guangzhou, China.

Y. Chen et al., "Cellular Based Machine to Machine Communication with Un-peer2peer Protocol Stack," IEEE 70th Vehicular Technology Conference (VTC), Sep. 2009, 5 pages, Anchorage, Alaska.

H. Chao et al., "Power Saving for Machine to Machine Communications in Cellular Networks," IEEE Workshop Proceedings of the Global Communications Conference (GLOBECOM), Dec. 2011, pp. 389-393.

A. Bartoli et al., "Low-Power Low-Rate Goes Long-Range: The Case for Secure & Cooperative Machine-to-Machine Communications," Workshop on Wireless Cooperative Network Security (WCNS), May 2011, 12 pages, Valencia, Spain.

C.-Y. Tu et al., "Energy-Efficient Algorithms and Evaluations for Massive Access Management in Cellular Based Machine to Machine Communications," IEEE Vehicular Technology Conference (VTC), Sep. 2011, 5 pages.

A.S. Lioumpas et al., "Uplink Scheduling for Machine-to-Machine Communications in LTE-Based Cellular Systems," IEEE Proceedings of the Global Communications Conference (GLOBECOM), Dec. 2011, pp. 353-357.

B. Prabhakar et al., "Energy-Efficient Transmission Over a Wireless Link Via Lazy Packet Scheduling," IEEE 20th Annual Joint Conference of the Computer and Communication Societies (INFOCOM), Apr. 2001, pp. 386-394, vol. 1, Anchorach, Alaska.

A. El Gamal et al., "Energy-Efficient Scheduling of Packet Transmissions Over Wireless Networks," IEEE 21st Annual Joint Conference of the Computer and Communications Societies (INFOCOM), Jun. 2002, pp. 1773-1782, vol. 3.

I. Keslassy et al., "Faster Algorithms for Minimum-Energy Scheduling of Wireless Data Transmissions," Modeling and Optimization in Mobile, Ad Hoc and Wireless Networks (WiOpt '03), Mar. 2003, 9 pages, INRIA Sophia-Antipolis, France.

B. Rengarajan et al., "Architecture and Abstractions for Environment and Traffic Aware System-Level Coordination of Wireless Networks," IEEE/ACM Transactions on Networking, Jun. 2011, pp. 721-734, vol. 19, No. 3.

Michael J. Neely, "Intelligent Packet Dropping for Optimal Energy-Delay Tradeoffs in Wireless Downlinks," IEEE Transactions on Automatic Control, Mar. 2009, pp. 565-579, vol. 54, No. 3.

\* cited by examiner

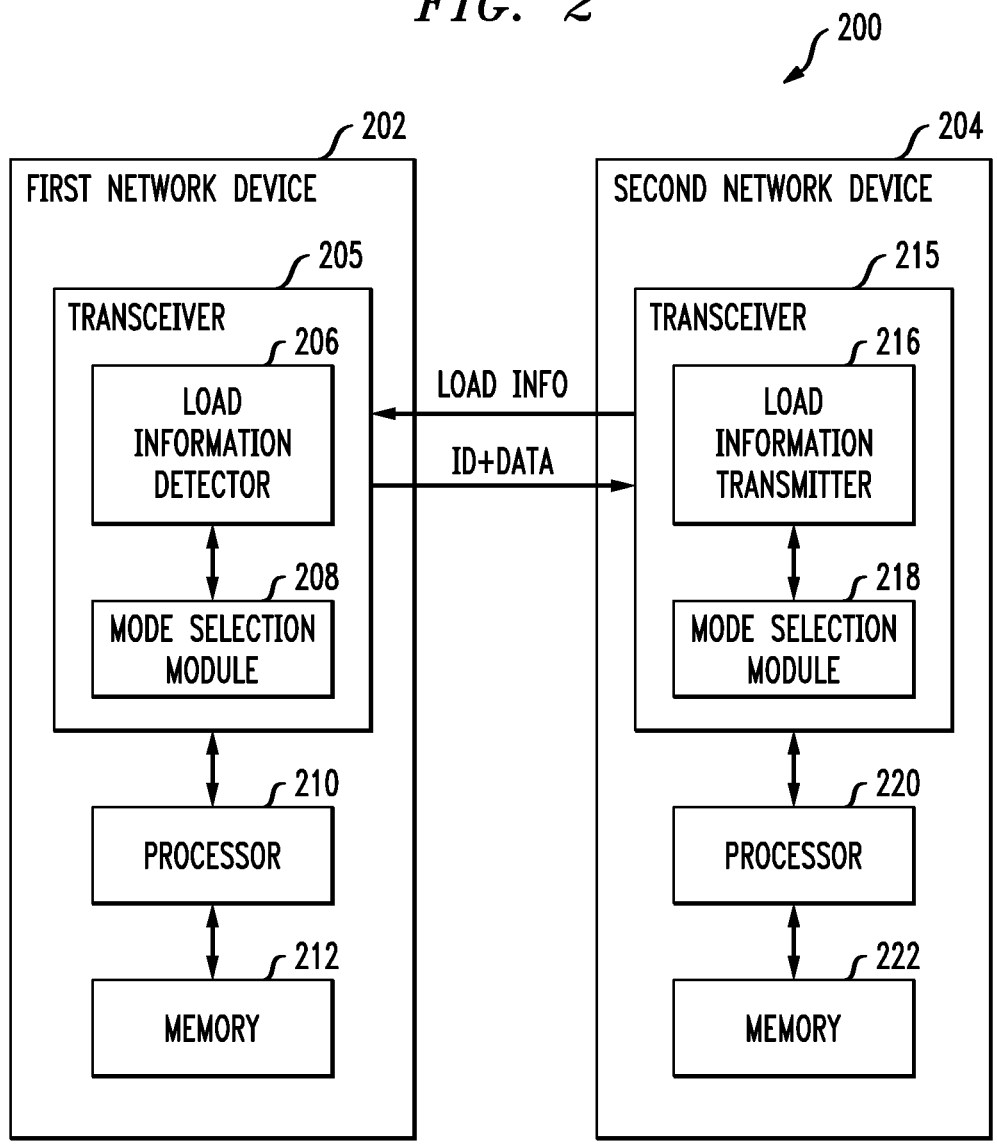

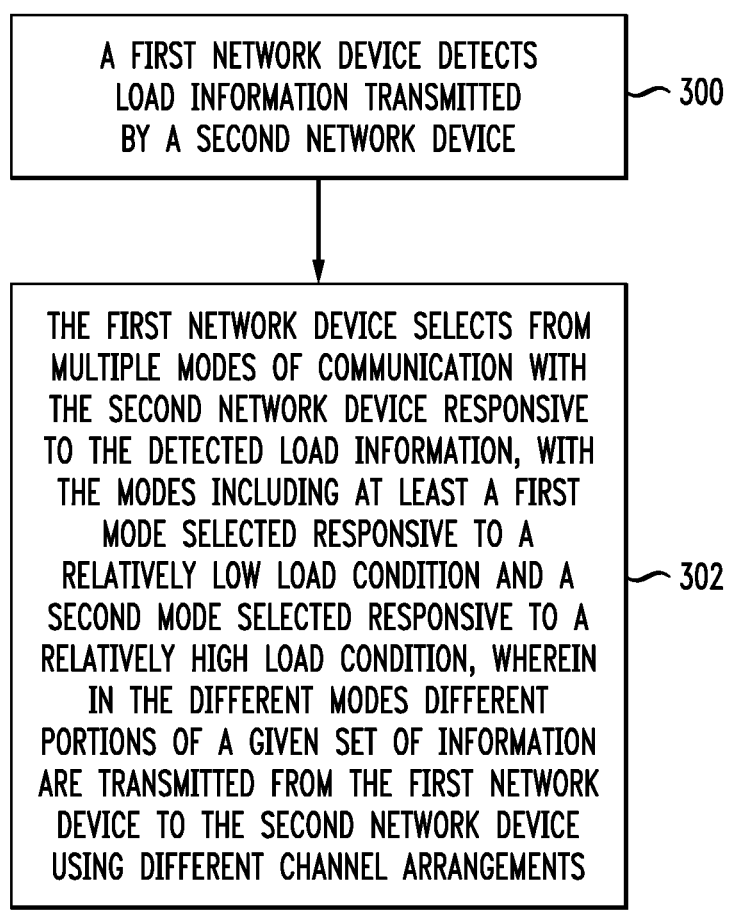

LOAD-DEPENDENT TRANSMISSION IN COMMUNICATION NETWORKS

FIELD

The field relates generally to communication networks, and more particularly to techniques for transmitting information in such networks.

BACKGROUND

In communication networks, load can vary significantly over time. This is particularly true in machine-to-machine (M2M) communication networks. Such networks may be configured, for example, to support wide area communication of sensor data to Internet-based applications. M2M communications span multiple vertical industries such as transportation, healthcare, utilities, retail, industrial monitoring, banking, and home automation and include a variety of applications within each vertical.

M2M traffic is typically distinct from consumer traffic and is characterized by more frequent but short lived transactions with small payloads. For example, a fleet management application can require transmission of location information every 20 seconds by each vehicle to a central application server with each transaction involving a payload of less than about 500 bytes. Similarly, reporting of health data such as blood pressure or heart rate by medical devices usually involves payloads less than about 200 bytes.

Many communication networks, including mobile cellular networks such as fourth generation Long Term Evolution (LTE) cellular networks, are designed for handling consumer communication applications such as voice, video streaming, video conferencing, web browsing and file transfers where the communication sessions are long lived. Thus a typical session involves establishment of dedicated radio bearers by first using a common random access channel to send relevant control information such as identity of the mobile device followed by actual transmission of higher layer signaling messages and then application data over scheduled dedicated resources. However, use of this current cellular communication technology for M2M applications can result in a disproportionately large amount of signaling traffic relative to data traffic.

LTE networks and other conventional wireless networks such as IEEE 802.11n networks have mechanisms such as rate adaptation and scheduling for dynamically allocating resources to serve multiple users. However, these mechanisms and the underlying techniques for establishing traffic channels via random access channels are designed to operate under a relatively narrow range of load conditions. For very low loads, the network resources are underutilized, and for very high loads, the network resources are insufficient and an excessive number of users may be dropped. While these networks can adapt the transmission rate to meet different link conditions, they do not adapt efficiently to meet widely varying load conditions.

Also, current network design is often focused on maximizing throughput. However, if the application is such that each node needs to only send a small amount of data, as in the above-described M2M communication context, throughput is not necessarily the most meaningful metric.

SUMMARY

Illustrative embodiments of the present invention provide load-dependent transmission functionality implemented in one or more network devices of a communication network. Such arrangements can provide significantly better utilization of network resources for M2M traffic and other types of traffic involving large numbers of short lived transactions having small payloads. Similar advantages are provided in numerous other networks that are subject to widely varying load conditions.

In one embodiment, a first network device is adapted for communication with at least a second network device. The first network is configured to detect load information transmitted by the second network device and to select one of a plurality of modes of communication responsive to the detected load information. The modes of communication include at least a first mode of communication that is selected responsive to the detected load information indicating a relatively low load condition and a second mode of communication that is selected responsive to the detected load information indicating a relatively high load condition. In each of the plurality of modes particular information is to be transmitted from the first network device to the second network device including at least one identifier and associated data, and in different ones of the plurality of modes different portions of the particular information are transmitted from the first network device to the second network device using different channel arrangements.

First and second different channel arrangements in some embodiments may comprise at least one random access channel and at least one scheduled channel, respectively. As one example of the first and second modes of communications, in the first mode of communication the first network device may transmit the identifier and the data to the second network device using a random access channel, and in the second mode of communication the first network device may transmit the identifier to the second network device using the random access channel and may transmit the data to the second network device using a scheduled channel.

A wide variety of other combinations of multiple selectable modes of communication using random access channels, scheduled channels or other types of channels or channel arrangements may be used in implementing embodiments of the invention.

It should be noted in this regard that the term "channel" as used herein is intended to be broadly construed, and different channels need not have different resources such as carrier frequency or bandwidth, but instead can be formed using a given set of such resources. Also, the different channel arrangements can be formed using one or more channels.

The first and second network devices in some embodiments may comprise respective sensor and access point nodes of a wireless network, although it is to be appreciated that numerous other types of network devices and communication networks may be used in other embodiments.

BRIEF DESCRIPTION OF THE DRAWINGS

FIG. 2 is a more detailed view of first and second network devices in one possible implementation of the FIG. 1 wireless network.

FIG. 3 is a flow diagram of a communication process carried out between the first and second network devices of FIG. 2.

DETAILED DESCRIPTION

Illustrative embodiments of the invention will be described herein with reference to exemplary communication networks, network devices and associated communication modes and channels. It should be understood, however, that the invention is not limited to use with the particular arrangements described, but is instead more generally applicable to any communication network application in which it is desirable to provide improved performance under varying load conditions.

Figure 1A:
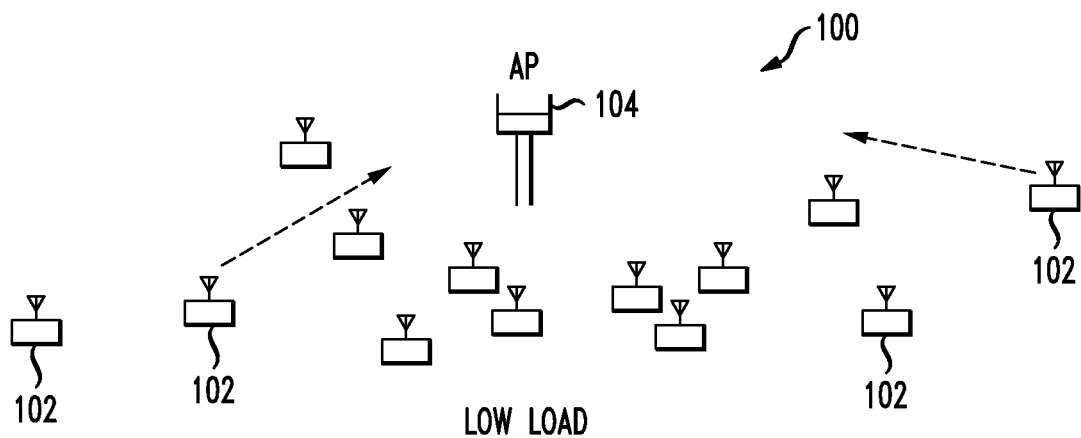
FIGS. 1A and 1B show a wireless network under respective low and high load conditions in an illustrative embodiment of the invention.
Figure 1B:
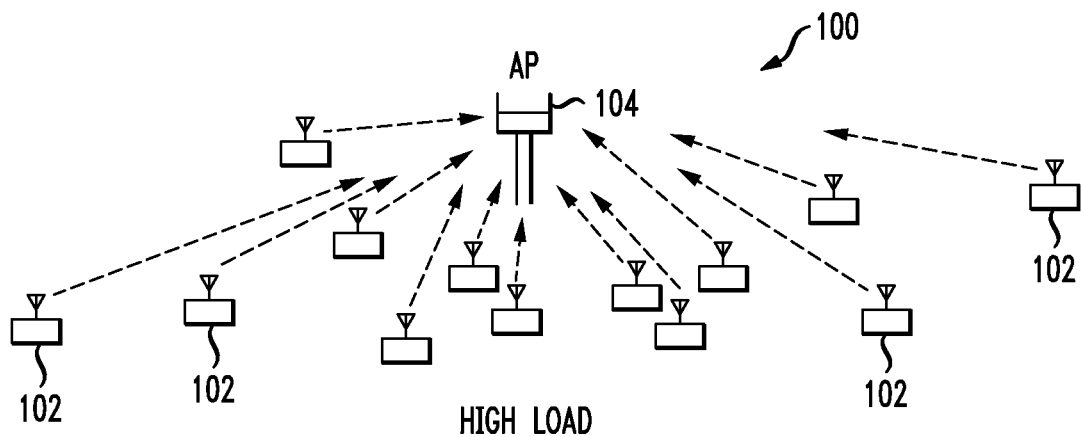

FIGS. 1A and 1B show a wireless network 100 under respective low and high load conditions in an illustrative embodiment of the invention. The wireless network 100 may represent at least a portion of an M2M network or other type of communication network. The wireless network 100 comprises a plurality of nodes including multiple wireless sensor nodes 102 that communicate with a wireless access point (AP) node 104.

Numerous other types and arrangements of nodes may be used in other embodiments. However, the term "node" as used herein is intended to be broadly construed, and accordingly may comprise, for example, an entire network device or one or more components of a network device.

It is assumed for certain embodiments disclosed herein that each such node corresponds to a separate network device. The network devices may comprise computers, mobile phones or other processing devices, in any combination. A given network device will generally comprise a processor and a memory coupled to the processor, as well as one or more transceivers or other types of network interface circuitry which allow the network device to communicate with the other network devices. The sensor nodes 102 and access point node 104 of the wireless network 100 are therefore considered examples of what are more generally referred to herein as "network devices."

The sensor nodes 102 and access point node 104 may be fixed or mobile. Accordingly, various combinations of fixed and mobile nodes may be used in a given communication network, while other networks may comprise all fixed nodes or all mobile nodes. Each of the sensor nodes 102 in a given network may be configured in substantially the same manner, or different configurations may be used for different subsets of the sensor nodes within a given network.

The terms "sensor node" and "access point node" as used herein are intended to be broadly construed, and may comprise respective remote and centralized network devices of a given communication network. By way of example, a sensor node may comprise a simple device such as a data collection sensor or a substantially more complex device such as a mobile phone.

The wireless network 100 may be configured to serve multiple applications encompassing different data rates and quality of service requirements. The resulting traffic can be characterized in terms of load, which may be defined, for example, as the number of requests for service per unit time per unit bandwidth.

Traffic demands on the network resources can vary significantly over time. The wireless network 100 is therefore configured to dynamically adapt to different load conditions. More particularly, the wireless network 100 operates efficiently over a wide range of load conditions in a dynamic fashion.

FIG. 1A illustrates a relatively low load condition, in which only a few sensor nodes 102 communicate data to the access point node 104. FIG. 1B illustrates a relatively high load condition, in which all of the sensor nodes 102 communicate data to the access point node 104.

It is assumed that the communication requirements of the sensor nodes 102 are characterized by a small payload of about 1000 bits or less, and possibly also a large latency constraint of about 0.5 seconds. This latency is typical of applications relating to measurement or other sensing of natural phenomena. When sensing natural phenomena, a latency of 0.5 seconds is usually sufficient for the information to remain relevant. Examples include detecting flooding or signaling a medical emergency. This latency is also sufficient for time-insensitive applications like meter reading. Other types of payload and latency requirements may be present in other embodiments.

Also, the term "payload" as used herein is intended to be broadly construed, and may refer to a payload of a packet that has at least one corresponding header, or may more generally refer to an entire packet or even a set of packets. Thus, a payload as the term is broadly used herein may comprise both an identifier and associated data to be transmitted, or other sets of information to be transmitted including at least a portion of at least one identifier and associated data.

The wireless network 100 is generally configured such that its transmission architecture is dependent on the current network load. For example, in one possible configuration, if the load is at or below a specified threshold, then a first transmission mode is used. Otherwise, a second transmission mode is used. In such an arrangement, two different transmission modes are utilized in the respective low load and high load conditions illustrated in FIGS. 1A and 1B.

These multiple distinct transmission modes may be designed to address different performance metrics. In the above example, the first mode could be designed to have an extended coverage range compared to the second transmission mode. Furthermore, within each of these modes, various transmission parameters, such as spreading factor, duration, or bandwidth, can be adjusted based on the estimated load so as to minimize the transmit power of the sensor node. The various load-dependent transmission modes supported by the wireless network 100 are examples of what are more generally referred to herein as "communication modes."

The load-dependent transmission functionality of wireless network 100 is illustrated in more detail in FIG. 2, which shows a portion 200 of the wireless network 100 including first and second network devices 202 and 204 which may correspond, for example, to a particular one of the sensor nodes 102 and the access point node 104, respectively. Other arrangements are possible. For example, the wireless network 100 may be configured such that the sensor nodes 102 can communicate with each other as well as with the access point node 104. In other words, a given sensor node can be configured to serve as an access point node for other sensor nodes.

In the FIG. 2 embodiment, the first network device 202 is adapted for communication with the second network device 204. The first network device 202 comprises a transceiver 205 that includes a load information detector 206 coupled to a mode selection module 208. The first network device 202 further comprises a processor 210 coupled to the transceiver 205 and to a memory 212. The second network device 204 comprises a transceiver 215 that includes a load information transmitter 216 coupled to a mode selection module 218. The second network device 204 further comprises a processor 220 coupled to the transceiver 215 and to a memory 222.

It is to be appreciated that the particular arrangement of network device components shown in FIG. 2 is exemplary only, and numerous alternative network device configurations may be used in other embodiments.

The first network device 202 is generally configured to detect load information transmitted by the second network device and to select one of a plurality of modes of communication responsive to the detected load information. More particularly, load information detector 206 of transceiver 205 detects load information transmitted by the load information transmitter 216 of transceiver 215. Based on the detected load information, mode selection module 208 selects a particular one of the multiple available modes of communication. The mode selection module 218 of transceiver 215 provides a similar adjustment in the communication mode of the second network device 204.

This exemplary communication process involving first and second network devices 202 and 204 is generally illustrated in the flow diagram of FIG. 3, which includes steps 300 and 302 that are assumed to be performed by the first network device 202 responsive to load information transmitted by the second network device 204.

In step 300, the first network device 202 detects load information transmitted by the second network device 204. As noted above, this involves the load information detector 206 of transceiver 205 detecting load information transmitted by the load information transmitter 216 of transceiver 215. For example, the load information detector 206 may be configured to extract the load information from a beacon signal transmitted by the second network device 204. More particularly, the current load information may be carried in a particular recurring time slot of a transmitted beacon signal. Similar arrangements may be used to carry other information from the second network device 204 to the first network device 202, such as synchronization information and scheduling information.

In step 302, the first network device 202 selects from multiple modes of communication with the second network device 204 responsive to the detected load information. As noted above, this involves the mode selection module 208 of transceiver 205 selecting a particular mode of communication, with a similar adjustment being made using mode selection module 218 of transceiver 215. Thus, for example, it may be assumed that both of the mode selection modules 208 and 218 are configured to utilize the same mapping of load information to communication mode.

Additional information other than the current load information may be taken into account in a particular mode selection decision. As one example, the mode selection module 208 may be configured to select a particular one of the multiple available modes based on the current load information as well as additional information such as the channel gain between the first and second network devices, as estimated using the received signal-to-noise ratio (SNR) of the beacon signal, and the current state of the first network device, which may include a priority level of the data to be transmitted. This additional information or an associated mode selection based on such information can be communicated from the first network device to the second network device using any a wide variety of communication techniques.

The modes of communication referred to in the context of FIGS. 2 and 3 generally include at least a first mode of communication that is selected responsive to the detected load information indicating a relatively low load condition and a second mode of communication that is selected responsive to the detected load information indicating a relatively high load condition.

In each of the multiple modes supported in the first and second network devices 202 and 204, it is assumed that particular information is to be transmitted from the first network device 202 to the second network device 204. This particular information is assumed to include at least one identifier and associated data, where the FIG. 2 embodiment more specifically involves a single identifier referred to as an ID. In different ones of the multiple modes different portions of the particular information are transmitted from the first network device to the second network device using different channel arrangements, in a manner that provides better utilization of network resources, while also potentially reducing the transmit power requirements of the first network device and therefore reducing power consumption in that device. In accordance with the load-dependent mode selection, different portions of the identifier and associated data are sent by the transceiver 205 to the transceiver 215 using different channel arrangements.

As mentioned previously, the term "channel" as used herein is intended to be broadly construed, and different channels need not have different resources such as carrier frequency or bandwidth, but instead can be formed using a given set of such resources. Thus, for example, distinct arrangements of time slots may comprise respective different channel arrangements. Different channel arrangements as that term is broadly used herein may comprise, for example, respective different types of channels, or respective different arrangements of a single type of channel.

Accordingly, a particular communication mode disclosed herein may utilize a different channel or set of channels, or more generally a different channel arrangement, than another communication mode, while nonetheless sharing at least a portion of the same set of resources, such as carrier frequency or bandwidth.

By way of example, first and second different channel arrangements in one or more embodiments disclosed herein may comprise at least one random access channel and at least one scheduled channel, respectively. Thus, as a more particular example, a first mode of communication utilizes a random access channel to transmit both an ID and associated data, while a second mode of communication utilizes a random access channel to transmit the identifier and a scheduled channel to transmit the data, although a wide variety of other types of channels and channel arrangements may be used.

The random access channels used in a given embodiment of the invention may comprise code division multiple access (CDMA) channels, frequency division multiple access (FDMA) channels, or time division multiple access (TDMA) channels, as well as portions or combination of these and other types of channels. A given scheduled channel may comprise, for example, a particular scheduled time slot of an orthogonal frequency division multiplexed (OFDM) channel. Again, numerous other different channel types and arrangements may be used.

It should be noted that there can be many more than two distinct modes of communication supported in a given embodiment of the invention. Examples to be described below include various combinations of two or more of four different supported communication modes, denoted Mode A, Mode B, Mode C and Mode D. In these examples, multiple identifiers may be communicated by the first network device 202 to the second network device 204. Such multiple identifiers may illustratively comprise a preamble identifier and a user equipment (UE) identifier, although many other types and combinations of identifiers may be used. Examples of illustrative identifiers that may be used in some embodiments are also referred to as IDs.

As noted above, load may be defined as the number of service requests per unit time per unit bandwidth. Other definitions of load may be used in other embodiments. For example, possible alternative definitions of load could involve weighting unfulfilled requests differently than first-time requests. Other types of load definitions which account for service time could also be used. Accordingly, load information utilized in selecting a mode of communication herein may have a wide variety of different formats.

The particular process steps illustrated in the flow diagram of FIG. 3 are exemplary only, and additional or alternative process steps may be used in other embodiments.

Referring again to FIG. 2, each of the network devices 202 and 204 comprises a processor 210 or 220 and a memory 212 or 222. The processor 210 or 220 of such a network device may be implemented utilizing a microprocessor, a microcontroller, an application-specific integrated circuit (ASIC), a field-programmable gate array (FPGA), or other type of processing circuitry, as well as portions or combinations of such processing circuitry. The processor may include one or more embedded memories as internal memories.

The processor 210 or 220 and any associated internal or external memory may be used in storage and execution of one or more software programs for controlling the operation of the corresponding network device 202 or 204. Accordingly, one or more of the modules 206 and 208 of transceiver 205 in network device 202, one or more of the modules 216 and 218 of transceiver 215 in network device 204, or portions of these modules, may be implemented at least in part using such software programs.

Each of the memories 212 and 222 of the network devices 202 and 204 is assumed to include one or more storage areas that may be utilized for program code storage. The memory 212 or 222 may therefore be viewed as an example of what is more generally referred to herein as a computer program product or still more generally as a computer-readable storage medium that has executable program code embodied therein. Other examples of computer-readable storage media may include disks or other types of magnetic or optical media, in any combination.

The memory 212 or 222 may therefore comprise, for example, an electronic random access memory (RAM) such as static RAM (SRAM), dynamic RAM (DRAM) or other types of electronic memory. The term "memory" as used herein is intended to be broadly construed, and may additionally or alternatively encompass, for example, a read-only memory (ROM), a disk-based memory, or other type of storage device, as well as portions or combinations of such devices.

The processor, memory, transceiver and other components of a given network device of wireless network 100 may include well-known conventional circuitry suitably modified to implement at least a portion of the load-dependent transmission functionality described above. Conventional aspects of such circuitry are well known to those skilled in the art and therefore will not be described in detail herein.

It is to be appreciated that a given node or associated network device as disclosed herein may be implemented using additional or alternative components and modules other than those specifically shown in the exemplary arrangement of FIG. 2.

As mentioned above, embodiments of the present invention may be implemented at least in part in the form of one or more software programs that are stored in a memory or other computer-readable storage medium of a network device or other processing device of a communication network.

Numerous alternative arrangements of hardware, software or firmware in any combination may be utilized in implementing these and other system elements in accordance with the invention. For example, embodiments of the present invention may be implemented in one or more ASICS, FPGAs or other types of integrated circuit devices, in any combination. Such integrated circuit devices, as well as portions or combinations thereof, are examples of "circuitry" as that term is used herein.

Figure 4A:
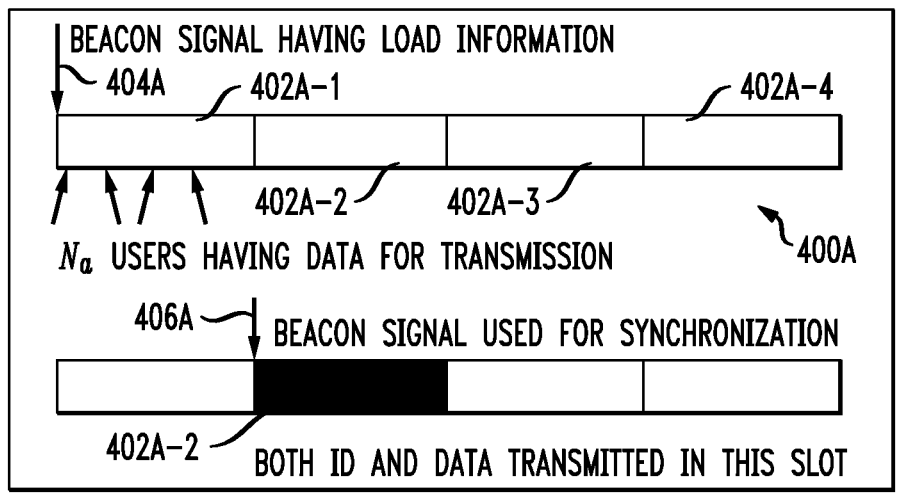
FIGS. 4A and 4B illustrate respective first and second modes of communication for transmitting information from the first network device to the second network device in accordance with the communication process of FIG. 3.
Figure 4B:
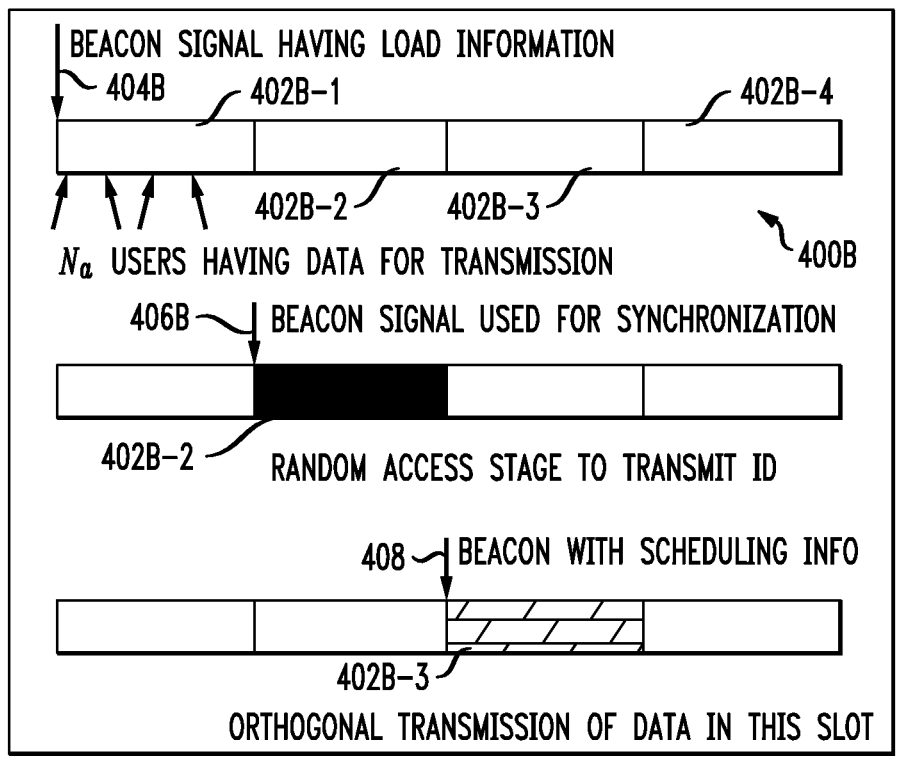

Referring now to FIGS. 4A and 4B, two distinct modes of communication for transmitting information from the first network device 202 to the second network device 204 using the FIG. 3 process are illustrated. These exemplary first and second modes of communication, referred to as Mode A and Mode B, respectively, are selectable based on current load information and possibly other information in the manner previously described. More particularly, Mode A is generally selected under a relatively low load condition such as that illustrated in FIG. 1A and Mode B is generally selected under a relatively high load condition such as that illustrated in FIG. 1B. These and other communication modes disclosed herein can be configured to minimize the total energy or power required for transmission of a given payload.

These modes assume a certain amount of correlation between the load information across multiple transmission intervals, and assume small payloads of less than about 1000 bits. As indicated previously, small payloads of this type are common in wireless sensor networks, such as M2M networks, in which sensor nodes communicate small packets generated from data measurements.

The communication modes of FIGS. 4A and 4B are illustrated for the uplink direction, assumed to be from the sensor nodes 102 to the access point node 104 in the wireless network 100, but similar techniques can be adapted in a straightforward manner for use in the downlink direction.

In both Mode A and Mode B, a beacon signal is transmitted by the access point node 104 in a slotted fashion to synchronize the uplink transmissions of the sensor nodes 102. The beacon signal also carries the current load information, as indicated previously. This load information is extracted from the beacon signal within a given sensor node 102 and utilized in the manner described above to select Mode A or Mode B for communication with the access point node 104. There may be a predetermined mapping between particular load levels and the modes, with relatively low and relatively high loads automatically corresponding to respective Modes A and B, or additional information such as channel gain or data priority may be taken into account as well.

As will be described in greater detail below, in Mode A both an identifier and associated data are transmitted from a given sensor node 102 to the access point node 104 using a random access channel, and in Mode B the identifier is transmitted from the given sensor node 102 to the access point node 104 using the random access channel and the associated data is transmitted from the given sensor node 102 to the access point node 104 using a scheduled channel. The identifier in this embodiment may be a UE identifier of the given sensor node 102.

Each mode operates in a slotted fashion, with the slot duration being approximately equal to the latency requirement. For example, as mentioned previously, the latency requirement may be on the order of 0.5 seconds, although numerous other latencies may be used. Also, in other embodiments, slot duration need not be based on any particular latency requirement.

As shown in FIG. 4A, Mode A uses a slotted CDMA random access protocol in which each sensor node 102 modulates its data using a spreading code selected randomly from a fixed set of codes. A given set of slots 400A comprises slots 402A-1, 402A-2, 402A-3 and 402A-4 as indicated. The sensor nodes 102 receive a beacon signal as indicated at 404A and obtain the current load information therefrom. Assuming that there are $N_a$ active sensor nodes or "users" having data available for transmission, these nodes attempt to transmit in the slot 402A-1 using random spreading.

Transmission failure occurs for a given one of the sensor nodes 102 if the attempted transmission is received with insufficient SNR due to fading or unexpected interference, or if another one of the sensor nodes 102 chooses the same spreading code as the given sensor node. In either case, the given sensor node may be configured to retransmit until an acknowledgement is received or until the maximum number of retransmissions is exceeded.

It is assumed that the given sensor node communicates both its ID and associated data in slot 402A-2 after obtaining synchronization information from a beacon signal as indicated at 406A. The ID and data are assumed to comprise an entire 1000 bit payload. The given sensor node may utilize the current load information and a target probability of failure to calculate an appropriate spreading factor that minimizes the transmit power.

As shown in FIG. 4B, Mode B uses a communication protocol that has different stages for transmission of the ID and the data, respectively. The first stage uses a slotted CDMA random access protocol similar to that of Mode A as previously described, except that instead of sending the entire 1000 bit payload including both ID and data, only a portion (e.g., 50 bits) of the entire payload is sent, conveying only the ID of a given sensor node 102. A given set of slots 400B comprises slots 402B-1, 402B-2, 402B-3 and 402B-4 as indicated. The sensor nodes 102 receive a beacon signal as indicated at 404B and obtain the current load information therefrom. Again assuming that there are $N_a$ active sensor nodes or "users" having data available for transmission, these nodes attempt to transmit in the slot 402B-1 using random spreading.

It is assumed that a given one of the sensor nodes 102 communicates just its ID in slot 402B-2 after obtaining synchronization information from a beacon signal as indicated at 406B. As in Mode A, the given sensor node may utilize the current load information and a target probability of failure to calculate an appropriate spreading factor that minimizes the transmit power.

In the second stage of the Mode B protocol, scheduled FDMA transmission is used to transmit the data from the given sensor node 102 in the immediately following slot 402B-3. Accordingly, those sensor nodes for which respective IDs were transmitted in slot 402B-2 are automatically scheduled for transmission of their associated data in the following slot 402B-3. This may involve utilizing scheduling information obtained from a beacon signal as indicated at 408. The sensor nodes scheduled to transmit data in slot 402B-2 are assigned orthogonal frequency resources in accordance with the scheduled FDMA transmission. The scheduling information provided in the beacon signal may comprise, for example, center frequency and bandwidth for each node. In other embodiments, the scheduled nodes may be assigned to shared frequency resources, and successive interference cancellation could be used at the access point node 104 to mitigate interference.

Transmission failure occurs in the second stage of the Mode B protocol if the attempted transmission is received with insufficient SNR due to fading or unexpected interference, or if there are insufficient bandwidth resources to support all the nodes that were successfully identified during the first stage. In either case, the given sensor node may be configured to retransmit until an acknowledgement is received or until the maximum number of retransmissions is exceeded.

In Mode B, the transmission bandwidth assigned to each sensor node in the second stage may be adjusted based on the number of node IDs transmitted in the first stage so as to minimize the transmit power.

Modes A and B of respective FIGS. 4A and 4B are one example of an arrangement in which in each of the modes particular information is to be transmitted from a first network device to a second network device, where the particular information includes at least one identifier and associated data, and in which in different ones of the modes different portions of the particular information are transmitted from the first network device to the second network device using different channel arrangements. Thus, in Mode A the ID and data are both transmitted using the same slotted CDMA random access channel, and in Mode B the ID is transmitted using a slotted CDMA random access channel and the data is transmitted using a scheduled FDMA channel.

The two communication modes described in conjunction with FIGS. 4A and 4B are presented by way of illustrative example only, and numerous other modes in any combination may be used.

For example, a third mode denoted Mode C could be used that includes a first stage in which the preamble ID is sent over a random access channel and a second stage in which the UE ID and data are sent. The preamble ID is assumed to contain even less information than the UE ID.

As another example, a fourth mode denoted Mode D could be similar to Mode C above but with transmission of the UE ID and the data separated over two distinct scheduled stages.

The various transmissions associated with these four distinct modes described above can be summarized as follows:
Mode A:
1st stage, random access: UE ID+data
Mode B:
1st stage, random access: UE ID
2nd stage, scheduled: data
Mode C
1st stage, random access: preamble ID
2nd stage, scheduled: UE ID+data
Mode D
1st stage, random access: preamble ID
2nd stage, scheduled: UE ID
3rd stage, scheduled: data In the embodiment described in conjunction with FIGS. 4A and 4B, a given sensor node 102 switches between Mode A and Mode B for respective relatively low and relatively high load conditions. However, with the addition of a third mode, the node can switch between Mode A, Mode B and Mode C responsive to changing load conditions, with Mode A being used for low loads, Mode B being used for medium loads, and Mode C being used for high loads. Similar types of load-based mode switching can be provided with the addition of a fourth mode or other modes beyond the fourth mode. Also, various combinations of any two or three of Modes A, B, C and D may be used in other embodiments.

Mode D in the above examples is similar to an LTE transmission mode. It would generally be most useful when the data payload is very large compared to the UE ID size, which is typical of consumer traffic. For the smaller payloads common in M2M applications, Mode C would usually be preferred over Mode D.

Again, the above-described communication modes and their corresponding channels are examples only, and should not be construed as limiting the scope of the invention in any way. In these and other embodiments, the particular available modes may be optimized in order to minimize the energy or power for a given probability of successfully transmitting the payload. This can allow a given communication network to dynamically support significantly more sensor nodes than would otherwise be possible using conventional approaches such as LTE. Moreover, usage of network resources is made more efficient in applications such as M2M networks and other types of communication networks in which load conditions can vary widely. In addition, sensor node power consumption can be considerably reduced.

Although certain illustrative embodiments are described herein in the context of wireless networks, other types of networks can be used in other embodiments. As noted above, a given such network may comprise, for example, an M2M network, wireless sensor network or other type of network comprising a large number of relatively low complexity nodes. However, the disclosed techniques may also be applied to a wide area computer network such as the Internet, a metropolitan area network, a local area network, a cable network, a telephone network or a satellite network, as well as portions or combinations of these or other networks. The term "network" as used herein is therefore intended to be broadly construed.

It should again be emphasized that the embodiments described above are for purposes of illustration only, and should not be interpreted as limiting in any way. Other embodiments may use different types of network, device and module configurations, and alternative communication modes, channel arrangements and process steps for implementing load-dependent transmission functionality. Also, it should be understood that the particular assumptions made in the context of describing the illustrative embodiments should not be construed as requirements of the invention. The invention can be implemented in other embodiments in which these particular assumptions do not apply. These and numerous other alternative embodiments within the scope of the appended claims will be readily apparent to those skilled in the art.

What is claimed is:

1. An apparatus comprising:
a first network device adapted for communication with at least a second network device;
the first network device being configured to detect load information transmitted by the second network device and to select one of a plurality of modes of communication responsive to the detected load information;
wherein the modes of communication include at least a first mode of communication that is selected responsive to the detected load information indicating a relatively low load condition and a second mode of communication that is selected responsive to the detected load information indicating a relatively high load condition;
wherein in each of the plurality of modes particular information is to be transmitted from the first network device to the second network device including at least one identifier and associated data; and
wherein in different ones of the plurality of modes different portions of the particular information are transmitted from the first network device to the second network device using different channel arrangements.

2. The apparatus of claim 1 wherein the first network device comprises a sensor node of a wireless network.

3. The apparatus of claim 1 wherein the second network device comprises an access point node of a wireless network.

4. The apparatus of claim 1 wherein said at least one identifier comprises at least one of a preamble identifier and a user equipment identifier.

5. The apparatus of claim 1 wherein in the first mode of communication the first network device transmits said at least one identifier and the data to the second network device using a random access channel, and in the second mode of communication the first network device transmits said at least one identifier to the second network device using the random access channel and transmits the data to the second network device using a scheduled channel.

6. The apparatus of claim 1 wherein said at least one identifier comprises first and second types of identifiers, and wherein in the first mode of communication the first network device transmits the first type of identifier and the data to the second network device using a random access channel, and in the second mode of communication the first network device transmits the second type of identifier to the second network device using the random access channel and transmits the first type of identifier and the data to the second network device using a scheduled channel.

7. The apparatus of claim 1 wherein said at least one identifier comprises first and second types of identifiers, and wherein in the first mode of communication the first network device transmits the first type of identifier and the data to the second network device using a random access channel, and in the second mode of communication the first network device transmits the second type of identifier to the second network device using the random access channel, transmits the first type of identifier to the second network device using a first scheduled channel and transmits the data to the second network device using a second scheduled channel.

8. The apparatus of claim 1 wherein said at least one identifier comprises first and second types of identifiers, and wherein in the first mode of communication the first network device transmits the first type of identifier to the second network device using a random access channel and transmits the data to the second network device using a scheduled channel, and in the second mode of communication the first network device transmits the second type of identifier to the second network device using the random access channel and transmits the first type of identifier and the data to the second network device using a scheduled channel.

9. The apparatus of claim 1 wherein said at least one identifier comprises first and second types of identifiers, and wherein in the first mode of communication the first network device transmits the first type of identifier to the second network device using a random access channel and transmits the data to the second network device using a scheduled channel, and in the second mode of communication the first network device transmits the second type of identifier to the second network device using the random access channel, transmits the first type of identifier to the second network device using a first scheduled channel and transmits the data to the second network device using a second scheduled channel.

10. The apparatus of claim 1 wherein said at least one identifier comprises first and second types of identifiers, and wherein in the first mode of communication the first network device transmits the second type of identifier to the second network device using a random access channel and transmits the first type of identifier and the data to the second network device using a scheduled channel, and in the second mode of communication the first network device transmits the second type of identifier to the second network device using the random access channel, transmits the first type of identifier to the second network device using a first scheduled channel and transmits the data to the second network device using a second scheduled channel.

11. The apparatus of claim 1 wherein first and second ones of the different channel arrangements comprise at least one random access channel and at least one scheduled channel, respectively.

12. The apparatus of claim 11 wherein said at least one random access channel comprises one of a code division multiple access channel, a frequency division multiple access channel and a time division multiple access channel.

13. The apparatus of claim 11 wherein said at least one scheduled channel comprises a scheduled time slot of an orthogonal frequency division multiplexed channel.

14. The apparatus of claim 1 wherein the first network device is configured to extract the load information from a beacon signal transmitted by the second network device.

15. A communication network comprising the apparatus of claim 1.

16. A method comprising:
  detecting in a first network device load information transmitted by a second network device; and
  selecting in the first network device one of a plurality of modes of communication with the second network device responsive to the detected load information;
  wherein the modes of communication include at least a first mode of communication that is selected responsive to the detected load information indicating a relatively low load condition and a second mode of communication that is selected responsive to the detected load information indicating a relatively high load condition;
  wherein in each of the plurality of modes particular information is to be transmitted from the first network device to the second network device including at least one identifier and associated data; and
  wherein in different ones of the plurality of modes different portions of the particular information are transmitted from the first network device to the second network device using different channel arrangements.

17. The method of claim 16 wherein in the first mode of communication the first network device transmits said at least one identifier and the data to the second network device using a random access channel, and in the second mode of communication the first network device transmits said at least one identifier to the second network device using the random access channel and transmits the data to the second network device using a scheduled channel.

18. The method of claim 16 wherein first and second ones of the different channel arrangements comprise at least one random access channel and at least one scheduled channel, respectively.

19. The method of claim 16 wherein said detecting comprises extracting the load information from a beacon signal transmitted by the second network device.

20. An article of manufacture comprising a non-transitory processor-readable storage medium having embodied therein executable program code that when executed by a processor of a first network device causes the first network device:
  to detect load information transmitted by a second network device; and
  to select one of a plurality of modes of communication with the second network device responsive to the detected load information;
  wherein the modes of communication include at least a first mode of communication that is selected responsive to the detected load information indicating a relatively low load condition and a second mode of communication that is selected responsive to the detected load information indicating a relatively high load condition;
  wherein in each of the plurality of modes particular information is to be transmitted from the first network device to the second network device including at least one identifier and associated data; and
  wherein in different ones of the plurality of modes different portions of the particular information are transmitted from the first network device to the second network device using different channel arrangements.

* * * * *